(12) United States Patent
Bintz et al.

(10) Patent No.: US 12,196,224 B2
(45) Date of Patent: Jan. 14, 2025

(54) COMPRESSOR VARIABLE VANE SPINDLE MOUNT WITH FLOATING SEAL

(71) Applicant: Raytheon Technologies Corporation, Farmington, CT (US)

(72) Inventors: Matthew E. Bintz, West Hartford, CT (US); Bernard W. Pudvah, Portland, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/207,761

(22) Filed: Jun. 9, 2023

(65) Prior Publication Data
US 2024/0410393 A1    Dec. 12, 2024

(51) Int. Cl.
*F01D 17/16* (2006.01)
*F02C 3/06* (2006.01)
*F04D 29/56* (2006.01)
*F04D 29/64* (2006.01)

(52) U.S. Cl.
CPC ......... *F04D 29/563* (2013.01); *F01D 17/162* (2013.01); *F02C 3/06* (2013.01); *F04D 29/644* (2013.01)

(58) Field of Classification Search
CPC .............................. F01D 17/162; F04D 29/563
See application file for complete search history.

(56) References Cited

U.S. PATENT DOCUMENTS

| | | | |
|---|---|---|---|
| 4,169,692 A | 10/1979 | McDonough et al. | |
| 4,193,738 A | 3/1980 | Landis, Jr. et al. | |
| 5,593,275 A | 1/1997 | Venkatasubbu et al. | |
| 6,210,106 B1 | 4/2001 | Hawkins | |
| 8,496,430 B2 | 7/2013 | Kilminster | |
| 10,794,219 B2 * | 10/2020 | Aker | F01D 17/162 |
| 11,105,342 B2 * | 8/2021 | Williamson | F04D 29/563 |
| 2004/0052636 A1 | 3/2004 | Schilling et al. | |
| 2019/0078461 A1 | 3/2019 | Aker et al. | |

OTHER PUBLICATIONS

European Search Report for EP Application No. 24181197.5 dated Aug. 21, 2024.

* cited by examiner

*Primary Examiner* — Sabbir Hasan
(74) *Attorney, Agent, or Firm* — Carlson, Gaskey & Olds, P.C.

(57) ABSTRACT

An actuation structure changes the orientation of a vane airfoil. A spindle is fixed to the airfoil such that when the arm turns the spindle, the spindle turns the airfoil, the spindle extends through a bore in the housing. A mount is between the spindle and the housing at the bore, with a metal wear sleeve pressed into the housing at the bore, such that it is part of the housing. A bushing is secured to an outer periphery of the spindle such that a bearing surface during rotation of the spindle is provided by an outer periphery of the bushing and an inner periphery of the metal wear sleeve. A seal is radially outward of the bushing with the seal providing an air seal between the spindle and the bore. A gas turbine engine is also disclosed.

20 Claims, 3 Drawing Sheets

COMPRESSOR VARIABLE VANE SPINDLE MOUNT WITH FLOATING SEAL

BACKGROUND OF THE INVENTION

This application relates to structure for mounting a spindle for a variable vane assembly in a gas turbine engine compressor section.

Gas turbine engines are known, and typically include a compressor section for compressing air and delivering it into a combustor. In the combustor air is mixed with the fuel and ignited. Products of this combustion pass downstream over turbine rotors, causing them to rotate.

In a compressor section there are typically rows of compressor blades separated by rows of static vanes. The vanes have an airfoil. Often the vanes may be variable. In a variable vane the orientation of the airfoil relative to an airflow direction through the compressor section may desirably change during engine operation.

Thus, it is known to include an assembly that pivots the airfoil between variable positions. Typically, a spindle is turned through an actuation mechanism to change the airfoil orientation.

Mounting the spindle has proven challenging. The spindle is typically relatively thin. A bushing which supports the spindle for rotation is fixed within a compressor housing. However, the contact area between the bushing and the spindle is relatively small due to the thin nature of the spindle.

This has often led to undesirable wear, and leaking of air from the compressor section outwardly through the spindle mount, which impacts on the efficiency of the engine.

SUMMARY OF THE INVENTION

In a featured embodiment, a compressor section for a gas turbine engine includes a compressor rotor and at least one row of blades configured to rotate during operation of an associated engine. At least one row of vanes is positioned to be adjacent the at least one row of blades. The at least one row of vanes has airfoils which are variable such that an orientation of the airfoil relative to an axial direction through the compressor section may change. An actuation structure changes the orientation of the airfoil. The actuation structure includes an arm for being selectively moved to rotate a spindle. The spindle is fixed to the airfoil such that when the arm turns the spindle, the spindle turns the airfoil, the spindle extends through a bore in the housing. A mount is between the spindle and the housing at the bore, with a metal wear sleeve pressed into the housing at the bore, such that it is part of the housing. A bushing is secured to an outer periphery of the spindle such that a bearing surface during rotation of the spindle is provided by an outer periphery of the bushing and an inner periphery of the metal wear sleeve. A seal is radially outward of the bushing with the seal providing an air seal between the spindle and the bore.

In another embodiment according to the previous embodiment, the seal floats radially on the spindle.

In another embodiment according to any of the previous embodiments, the bore in the housing is provided in part by an inwardly turned end of the metal wear sleeve.

In another embodiment according to any of the previous embodiments, the spindle extends beyond an upper end of the bushing.

In another embodiment according to any of the previous embodiments, a chamber is defined by the inwardly turned end of the metal wear sleeve and an upper end of the bushing and the seal is received in the chamber.

In another embodiment according to any of the previous embodiments, the bushing is formed of a carbon composite material.

In another embodiment according to any of the previous embodiments, the seal is formed of one of a composite material, a metal, a rubber material or polyamide.

In another embodiment according to any of the previous embodiments, the metal wear sleeve is formed of a steel or nickel.

In another embodiment according to any of the previous embodiments, the spindle extends beyond an upper end of the bushing.

In another embodiment according to any of the previous embodiments, a chamber is defined by the housing and the upper end of the bushing, and the seal is received in the chamber.

In another embodiment according to any of the previous embodiments, the bushing is formed of two parts, with a chamber defined intermediate the two parts and between an outer surface of the spindle and an inner surface of the metal wear sleeve, and the seal is received within that intermediate chamber.

In another embodiment according to any of the previous embodiments, a chamber is defined between an end of the bushing and the vane airfoil, and the seal is received in the chamber.

In another featured embodiment, a gas turbine engine includes a compressor section, a combustor, and a turbine section. The compressor section has a compressor rotor and at least one row of blades configured to rotate during operation of the engine. At least one row of vanes is positioned to be adjacent the at least one row of blades. The at least one row of vanes has airfoils which are variable such that an orientation of the airfoil relative to an axial direction through the compressor section may change. An actuation structure changes the orientation of the airfoil. The actuation structure includes an arm for being selectively moved to rotate a spindle. The spindle is fixed to the airfoil such that when the arm turns the spindle, the spindle turns the airfoil, the spindle extending through a bore in the housing. A mount is between the spindle and the housing at the bore, with a metal wear sleeve pressed into the housing at the bore, such that it is part of the housing. A bushing is secured to an outer periphery of the spindle such that a bearing surface during rotation of the spindle is provided by an outer periphery of the bushing and an inner periphery of the metal wear sleeve. A seal is radially outward of the bushing with the seal providing an air seal between the spindle and the bore.

In another embodiment according to any of the previous embodiments, the seal floats radially on the spindle.

In another embodiment according to any of the previous embodiments, the bore in the housing is provided in part by an inwardly turned end of the metal wear sleeve.

In another embodiment according to any of the previous embodiments, the spindle extends beyond an upper end of the bushing.

In another embodiment according to any of the previous embodiments, a chamber is defined by the inwardly turned end of the metal wear sleeve and an upper end of the bushing, and the seal is received in the chamber.

In another embodiment according to any of the previous embodiments, the spindle extends beyond an upper end of the bushing, and a chamber is defined by the housing and the upper end of the bushing and the seal is received in the chamber.

In another embodiment according to any of the previous embodiments, the bushing is formed of two parts, with a chamber defined intermediate the two parts and between an outer surface of the spindle and an inner surface of the metal wear sleeve, and the seal is received within that intermediate chamber.

In another embodiment according to any of the previous embodiments, a chamber is defined between an end of the bushing and the vane airfoil, and the seal is received in the chamber.

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
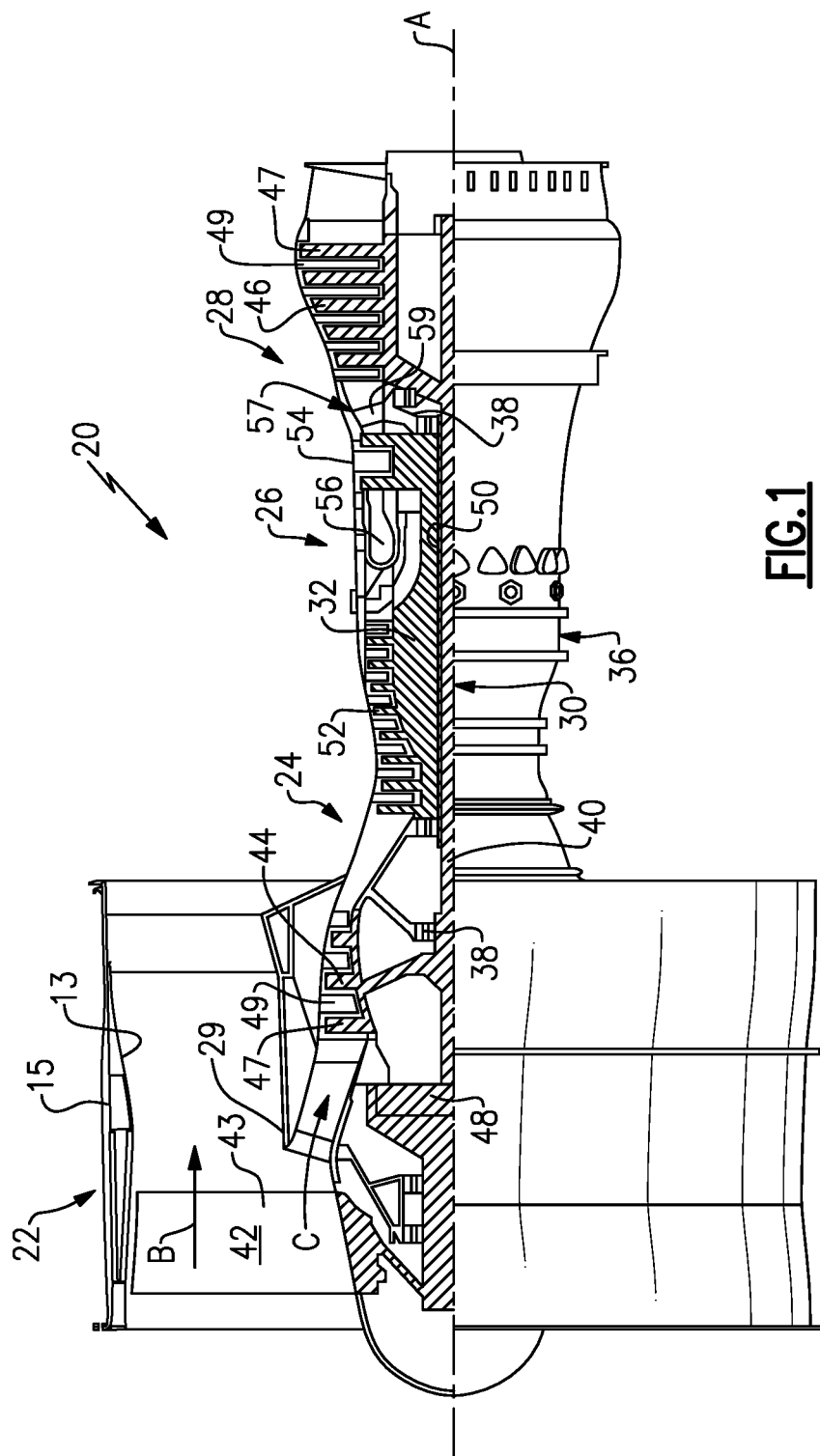
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram° R)/(518.7° R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F.

and 975.0° F. The relatively low EGT can be utilized in combination with the other techniques disclosed herein to reduce fuel consumption.

Figure 2A:
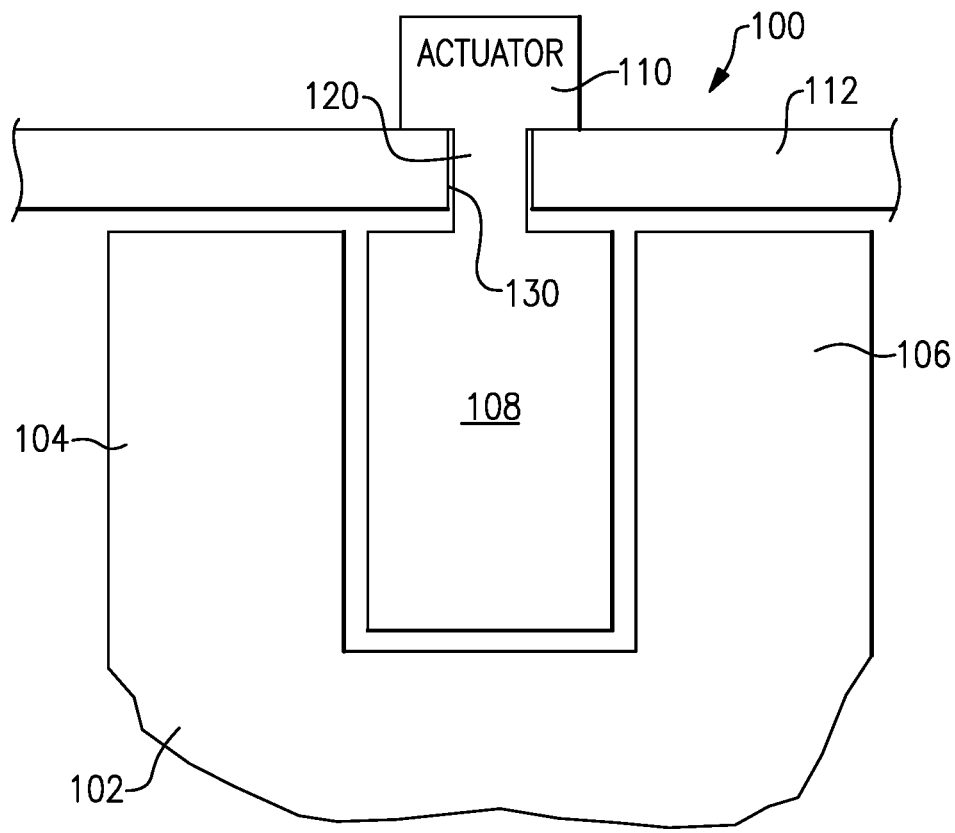
FIG. 2A shows a portion of a compressor section in a highly schematic manner.

FIG. 2A shows a portion of a compressor section 100 in a highly schematic manner. As shown, a compressor rotor 102 rotates compressor blades 104 and 106. Vanes 108 are typically static, and mounted between adjacent blade rows 104 and 106. While vane 108 is static during much of its operation, the vane 108 in this disclosure is "variable" such that the orientation of the airfoil provided by the vane 108 can change. An actuator 110 is shown schematically for rotating a spindle 120 and hence the airfoil of the vane 108. As shown, a compressor housing 112 surrounds the rotor 102, blades 104 and 106, and the vane 108. The spindle 120 passes through a bore 130 in a compressor housing. In one embodiment, there is a row of circumferentially spaced vanes.

Figure 2B:
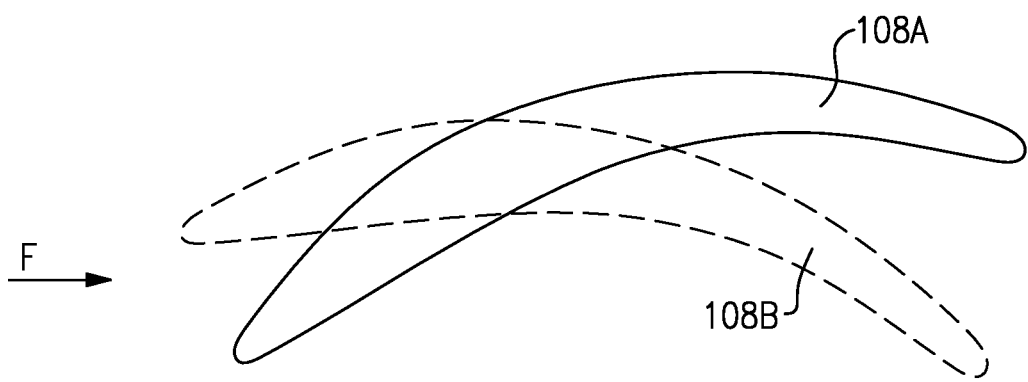
FIG. 2B shows a variable orientation of a vane in the compressor section of FIG. 2A.

As shown in FIG. 2B, the vane 108 may be in a first orientation 108A during certain flight information, but its orientation relative to a flow direction F of the air approaching the vane may change to orientation 108B under other operational conditions.

Figure 3A:
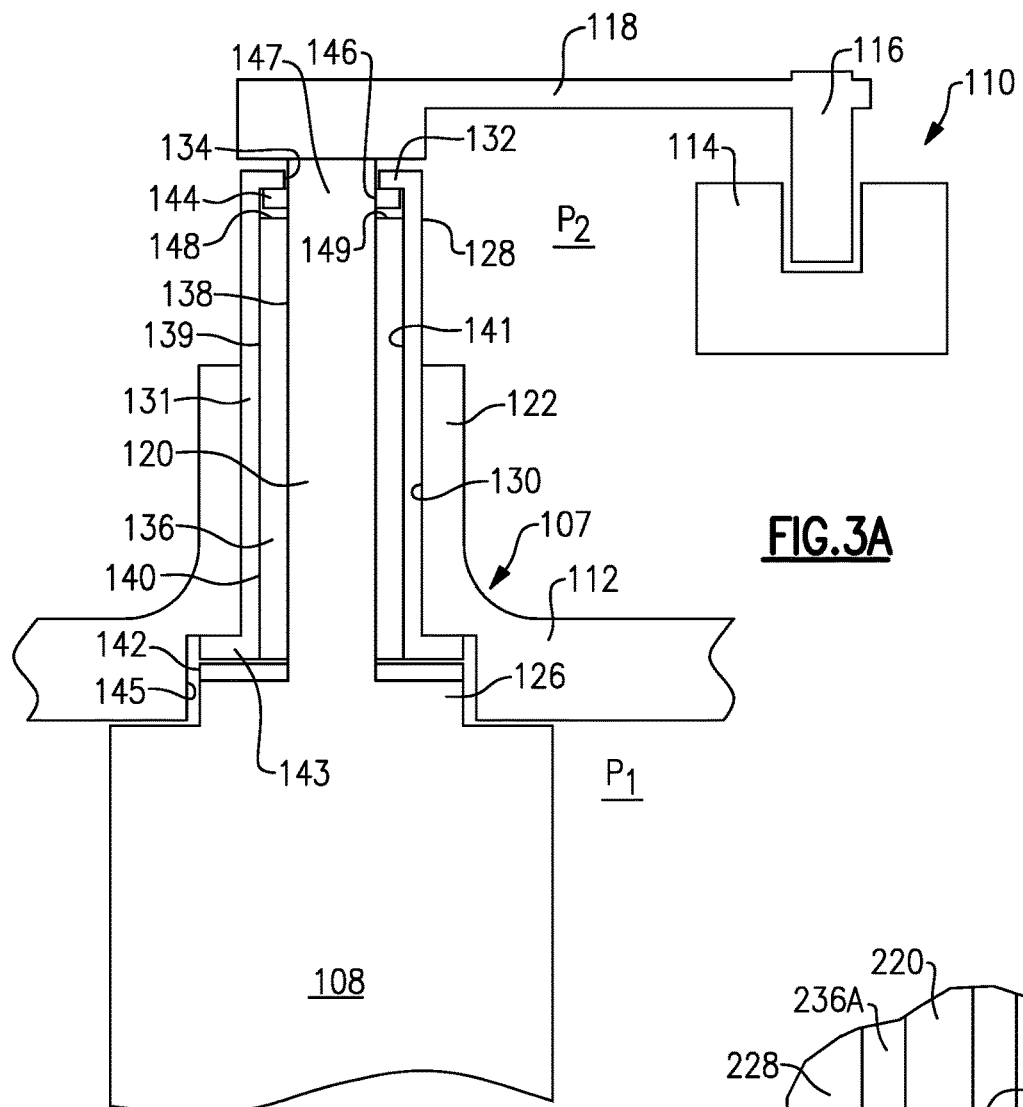
FIG. 3A shows greater detail of an actuation system for the variable vane.

FIG. 3A shows a detail of the mount of the vane 108. The actuation assembly 110 is shown to have a ring 114 which may move circumferentially to move a pin 116. When the pin 116 moves it moves arm 118 and causes spindle 120 to pivot. When spindle 120 pivots it changes the orientation of the airfoil of vane 108.

As mentioned above, in the prior art, the mount of the spindle 120 has had undesirable characteristics.

As shown, in a disclosed embodiment the compressor housing 112 has an upstanding boss 122 with the bore 130. A wear sleeve 128 is press fit into the bore 130. As shown, the metal wear sleeve 128 has an upper end 132 extending inwardly to define a bore 134 that receives an upper portion 147 of the spindle 120.

To increase a cross-sectional outer area of the spindle 120, a bushing 136 is press fit onto the spindle 120. Now, the contact area between an outer peripheral surface 139 of the bushing 136 and inner peripheral surface 141 of the metal wear sleeve 128 is greater than it would have been if the outer surface 138 of the spindle 120 was the bearing support surface. This provides a larger bearing surface that reduces contact stresses and wear.

In embodiments the bushing 136 may be formed of carbon composite, although other materials may be utilized such as another composite material, a metal sleeve or polyamides. The metal wear sleeve 128 may be a steel, including a stainless steel, a steel alloy or a nickel alloy steel although other materials may be used.

An inner end 143 of the wear sleeve 128 extends outwardly for a greater diameter relative to the portion extending along the boss 122. This enlarged portion 143 is received within a bore 145 at the lower end of the compressor boss 122. The spindle 120 also has an enlarged portion 126 radially inward of the enlarged portion 143. Thrust washer 142 is positioned between the enlarged portions 126 and 143 to protect the vane from metal on metal wear.

A seal 144 is positioned radially outward of the bushing 136 and within the inwardly extending portion upper end 132 of the wear sleeve 128. The seal 144 has an inner periphery 146 which closely surrounds an upper portion 147 of the spindle 120. Upper portion 147 extends radially beyond an outer end 148 of bushing 146.

The seal 144 can float along a radial direction to provide a reliable seal at the bore 134. Alternatively, the seal may be retained on the spindle. It could be said a chamber 149 is formed between inner surface 141 of the wear sleeve 128, the outer surface 138 of spindle 120, outer end 148 of bushing 136 and upper end 132 of wear sleeve 128. Seal 144 is received in chamber 149.

The seal 144 may be formed of a composite material, a metal, a rubber material or a polyamide.

As known, a pressure $P_1$ inward of the compressor housing 112 is much higher than a pressure $P_2$ radially outward of the compressor housing 112. As such, there is a radially outward bias force on the seal 144.

Figure 3B:
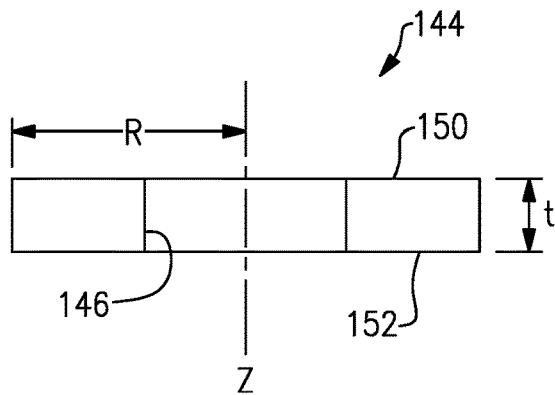
FIG. 3B shows a detail of a seal incorporated into the FIG. 3A embodiment.

FIG. 3B shows a detail of the seal 144. As shown, a radius from a central axis Z of the seal 144 to its outer periphery is defined as R. A thickness, t, is defined by a thickness between upper and lower surfaces 150 and 152. In one exemplary embodiment, a ratio of R to t is greater than 1. In other embodiments, the ratio of R to t is greater than 2.0. That is to say, the seal 144 is generally flat, which will result in more reliable sealing, and better wear resistance than an o-ring or other such seals.

Alternatively, an energy seal may be used. When pressurized an energy seal has a bore that will shrink to be tight on the spindle.

The metal wear sleeve 128 has sacrificial wear during operation of the vane, and thus protects the much more expensive compressor housing 112. If the metal wear sleeve 128 becomes worn, it can be easily replaced.

Figure 4:
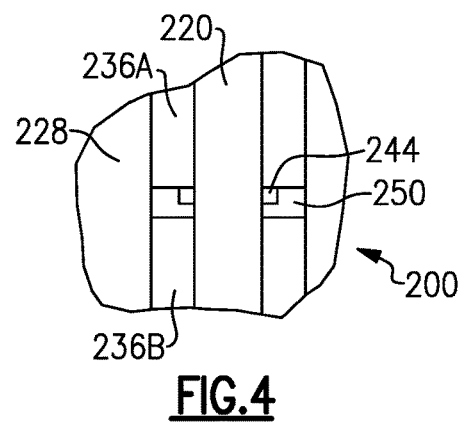
FIG. 4 shows an alternative embodiment.

FIG. 4 shows an embodiment 200 wherein the bushing is separated into two section 236A and 236B, and still secured to the spindle 220. A chamber 250 is formed between the spindle 220 and the metal wear sleeve 228. The seal 244 is received within this chamber 250.

Figure 5:
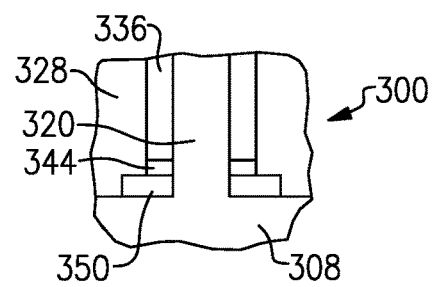
FIG. 5 shows yet another alternative embodiment.

FIG. 5 shows yet another embodiment 300 wherein the bushing 336 extends to a lower end and is secured to the spindle 320. The metal wear sleeve 328 is shown outside of the bushing 336. The vane 308 is shown attached to the spindle 320. A chamber 350 is formed below the bushing 336 and the seal 344 is received in chamber 350.

A compressor section 100 for a gas turbine engine under this disclosure could be said to include a compressor rotor 102 and at least one row of blades 104/106 configured to rotate during operation of the engine. At least one row of vanes 108 is positioned to be adjacent the at least one row of blades. The at least one row of vanes have airfoils which are variable such that an orientation of the airfoil relative to an axial direction through the compressor section may change. Actuation structure 110 changes the orientation of the airfoil. The actuation structure includes an arm 118 for being selectively moved to rotate a spindle 120. The spindle 120 is fixed to the airfoil such that when the arm turns the spindle 120, the spindle 120 turns the airfoil, the spindle 120 extends through a bore 130 in the housing 112. A mount is between the spindle and the housing at the bore, with a metal wear sleeve 128 pressed into the housing 112 at the bore 130, such that it is part of the housing. A bushing 136 is secured to an outer periphery of the spindle such that a bearing surface during rotation of the spindle 120 is provided by an outer periphery of the bushing 136 and an inner periphery of the metal wear sleeve 128 and a seal 144 radially outward of the bushing 136 providing an air seal between the spindle 120 and the bore 130.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A compressor section for a gas turbine engine comprising:
   a compressor rotor and at least one row of blades configured to rotate during operation of an associated engine;
   at least one row of vanes positioned to be adjacent the at least one row of blades;
   the at least one row of vanes having airfoils which are variable such that an orientation of a respective airfoil relative to an axial direction through the compressor section may change;
   an actuation structure for changing the orientation of the airfoil, the actuation structure including an arm for being selectively moved to rotate a spindle, the spindle being fixed to the airfoil such that when the arm turns the spindle, the spindle turns the airfoil, the spindle extending through a bore in a housing;
   a mount between the spindle and the housing at the bore, with a metal wear sleeve pressed into the housing at the bore, such that the metal wear sleeve is part of the housing;
   a bushing secured to an outer periphery of the spindle such that a bearing surface during rotation of the spindle is provided by an outer periphery of the bushing and an inner periphery of the metal wear sleeve; and
   a seal radially outward of the bushing with the seal providing an air seal between the spindle and the bore.

2. The compressor section as set forth in claim 1, wherein the seal floats radially on the spindle.

3. The compressor section as set forth in claim 1, wherein the bore in the housing is provided in part by an inwardly turned end of the metal wear sleeve.

4. The compressor section as set forth in claim 3, wherein the spindle extends beyond an upper end of the bushing.

5. The compressor section as set forth in claim 4, wherein a chamber is defined by the inwardly turned end of the metal wear sleeve and an upper end of the bushing and the seal is received in the chamber.

6. The compressor section as set forth in claim 1, wherein the bushing is formed of a carbon composite material.

7. The compressor section as set forth in claim 1, wherein the seal is formed of one of a composite material, a metal, a rubber material or polyamide.

8. The compressor section as set forth in claim 1, wherein the metal wear sleeve is formed of a steel or nickel.

9. The compressor section as set forth in claim 1, wherein the spindle extends beyond an upper end of the bushing.

10. The compressor section as set forth in claim 9, wherein a chamber is defined by the housing and the upper end of the bushing, and the seal is received in the chamber.

11. The compressor section as set forth in claim 1, wherein the bushing is formed of two parts, with a chamber defined intermediate the two parts and between an outer surface of the spindle and an inner surface of the metal wear sleeve, and the seal is received within that intermediate chamber.

12. The compressor section as set forth in claim 1, wherein a chamber is defined between an end of the bushing and the vane airfoil, and the seal is received in the chamber.

13. A gas turbine engine comprising:
    a compressor section, a combustor, and a turbine section;
    the compressor section having a compressor rotor and at least one row of blades configured to rotate during operation of the engine;
    at least one row of vanes positioned to be adjacent the at least one row of blades;
    the at least one row of vanes having airfoils which are variable such that an orientation of a respective airfoil relative to an axial direction through the compressor section may change;
    an actuation structure for changing the orientation of the airfoil, the actuation structure including an arm for being selectively moved to rotate a spindle, the spindle being fixed to the airfoil such that when the arm turns the spindle, the spindle turns the airfoil, the spindle extending through a bore in a housing;
    a mount between the spindle and the housing at the bore, with a metal wear sleeve pressed into the housing at the bore, such that the metal wear sleeve is part of the housing;
    a bushing secured to an outer periphery of the spindle such that a bearing surface during rotation of the spindle is provided by an outer periphery of the bushing and an inner periphery of the metal wear sleeve; and
    a seal radially outward of the bushing with the seal providing an air seal between the spindle and the bore.

14. The gas turbine engine as set forth in claim 13, wherein the seal floats radially on the spindle.

15. The gas turbine engine as set forth in claim 13, wherein the bore in the housing is provided in part by an inwardly turned end of the metal wear sleeve.

16. The gas turbine engine as set forth in claim 13, wherein the spindle extends beyond an upper end of the bushing.

17. The gas turbine engine as set forth in claim 16, wherein a chamber is defined by the inwardly turned end of the metal wear sleeve and an upper end of the bushing, and the seal is received in the chamber.

18. The gas turbine engine as set forth in claim 13, wherein the spindle extends beyond an upper end of the bushing, and a chamber is defined by the housing and the upper end of the bushing and the seal is received in the chamber.

19. The gas turbine engine as set forth in claim 13, wherein the bushing is formed of two parts, with a chamber defined intermediate the two parts and between an outer surface of the spindle and an inner surface of the metal wear sleeve, and the seal is received within that intermediate chamber.

20. The gas turbine engine as set forth in claim 13, wherein a chamber is defined between an end of the bushing and the vane airfoil, and the seal is received in the chamber.

* * * * *